(12) United States Patent
    Salgar

(10) Patent No.: US 10,922,431 B2
(45) Date of Patent: Feb. 16, 2021

(54) SYSTEMS AND METHODS FOR DYNAMICALLY MASKING VIDEO AND IMAGES CAPTURED BY A DRONE DEVICE CAMERA

(71) Applicant: Honeywell International Inc., Morristown, NJ (US)

(72) Inventor: Mayur S Salgar, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 340 days.

(21) Appl. No.: 15/855,055

(22) Filed: Dec. 27, 2017

(65) Prior Publication Data

US 2019/0197254 A1 Jun. 27, 2019

(51) Int. Cl.
   *G06F 21/62* (2013.01)
   *H04N 7/18* (2006.01)
   (Continued)

(52) U.S. Cl.
   CPC ........ *G06F 21/6245* (2013.01); *B64C 39/024* (2013.01); *B64D 47/08* (2013.01);
   (Continued)

(58) Field of Classification Search
   CPC .......... G06F 21/6245; G08B 13/19621; G08B 13/19686; G08B 13/1965; H04N 7/185; H04N 5/23229; G06K 9/00771; B64D 47/08; B64C 39/024; B64C 39/02; B64C 2201/146; B64C 2201/127; G06T 1/0014
   See application file for complete search history.

(56) References Cited

U.S. PATENT DOCUMENTS 7,742,656 B2   6/2010 Lee
8,666,110 B2*  3/2014 Yoo .......................... H04N 7/18
                                                      382/100
(Continued)

FOREIGN PATENT DOCUMENTS

CN          1705370 B      12/2011

OTHER PUBLICATIONS

English language translation of bibliographic data for CN1705370 (A), abstract not available for CN1705370 (A), abstract of corresponding document for GB2414885 (A).
(Continued)

*Primary Examiner* — Russell Frejd
(74) *Attorney, Agent, or Firm* — Seager Tufte & Wickhem LLP

(57) ABSTRACT

Systems and methods for dynamically masking video or images captured by a drone device camera are provided. Such systems and methods include flying the drone device proximate to a potential surveillance area while in a learning mode, capturing first video or images of the potential surveillance area, identifying first privacy masking areas in the first video or images, flying the drone device proximate to an active surveillance area while in a standard mode, capturing second video or images of the active surveillance area, identifying second privacy masking areas in the second video or images, and dynamically masking a portion of the second video or images that contains any of the first privacy masking areas or the second privacy masking areas.

20 Claims, 2 Drawing Sheets

(51) Int. Cl.
    *G06K 9/00* (2006.01)
    *B64D 47/08* (2006.01)
    *B64C 39/02* (2006.01)
    *G08B 13/196* (2006.01)

(52) U.S. Cl.
    CPC ... *G06K 9/00771* (2013.01); *G08B 13/19621* (2013.01); *G08B 13/19686* (2013.01); *H04N 7/185* (2013.01); *B64C 39/02* (2013.01); *B64C 2201/127* (2013.01); *B64C 2201/146* (2013.01); *G08B 13/1965* (2013.01)

(56) References Cited

U.S. PATENT DOCUMENTS

| | | | | |
|---|---|---|---|---|
| 8,867,853 B2* | 10/2014 | Migdal | .................. | H04N 7/18 |
| | | | | 382/232 |
| 9,058,523 B2* | 6/2015 | Merkel | ............ | G08B 13/19652 |
| 9,600,727 B2* | 3/2017 | Migdal | .............. | G06F 21/6245 |
| 9,940,525 B2* | 4/2018 | Wolf | .................. | G06K 9/00771 |
| 10,192,061 B2* | 1/2019 | Kumar | .................. | G06F 21/602 |
| 10,565,395 B2* | 2/2020 | Matusek | ............. | G06F 21/6245 |
| 2010/0328460 A1* | 12/2010 | Merkel | ............ | G08B 13/19686 |
| | | | | 348/143 |
| 2011/0150327 A1* | 6/2011 | Yoo | ............................ | G06T 1/00 |
| | | | | 382/165 |
| 2013/0004090 A1* | 1/2013 | Kundu | .................... | G06T 11/60 |
| | | | | 382/232 |
| 2014/0140575 A1* | 5/2014 | Wolf | .................. | G06K 9/00771 |
| | | | | 382/103 |
| 2014/0316614 A1* | 10/2014 | Newman | ............ | G06Q 30/0611 |
| | | | | 701/3 |
| 2015/0049912 A1* | 2/2015 | Migdal | .................. | G07F 19/207 |
| | | | | 382/103 |
| 2016/0107749 A1 | 4/2016 | Mucci | | |
| 2016/0116914 A1 | 4/2016 | Mucci | | |
| 2017/0018058 A1 | 1/2017 | Spinelli et al. | | |
| 2017/0220816 A1* | 8/2017 | Matusek | .............. | G06K 9/3233 |
| 2017/0300757 A1* | 10/2017 | Wolf | .................... | G06K 9/3233 |
| 2018/0025473 A1* | 1/2018 | Contreras | .............. | G01C 21/00 |
| | | | | 348/144 |
| 2018/0025649 A1* | 1/2018 | Contreras | .............. | G01C 21/00 |
| | | | | 701/3 |
| 2018/0211050 A1* | 7/2018 | Kumar | .................. | G08B 13/196 |
| 2018/0232580 A1* | 8/2018 | Wolf | ...................... | H04N 7/183 |
| 2018/0324436 A1* | 11/2018 | Danielsson | ........... | H04N 19/114 |
| 2018/0330591 A1* | 11/2018 | Tilkin | .................... | G11B 27/34 |
| 2019/0035128 A1* | 1/2019 | Russell | .................. | B64C 39/024 |
| 2019/0036887 A1* | 1/2019 | Miller | .................... | G06Q 20/06 |

OTHER PUBLICATIONS

English language translation of abstract, claims, and description of CN1705370B.

Bonetto et al., Privacy in Mini-drone Based Video Surveillance, accessed electronically on Oct. 10, 2017.

* cited by examiner

SYSTEMS AND METHODS FOR DYNAMICALLY MASKING VIDEO AND IMAGES CAPTURED BY A DRONE DEVICE CAMERA

FIELD

The present invention relates generally to drone devices. More particularly, the present invention relates to systems and methods for dynamically masking video or images captured by a drone device camera.

BACKGROUND

Known systems and methods for controlling surveillance of a residence using a drone device lack reliable systems and methods for protecting the privacy of neighbors of the residence or other areas near the residence. For example, known systems and methods may rely on the discretion of a user of the drone device to avoid invading the privacy of the neighbors or nearby areas. However, such reliance may be unreliable. Furthermore, such systems and methods may limit the flight path of the drone device to prevent privacy intrusions. However, limiting the flight path may reduce the effectiveness of the drone device as a security monitoring tool for the residence.

In view of the above, there is a continuing, ongoing need for improved systems and methods.

DETAILED DESCRIPTION

Figure 1:
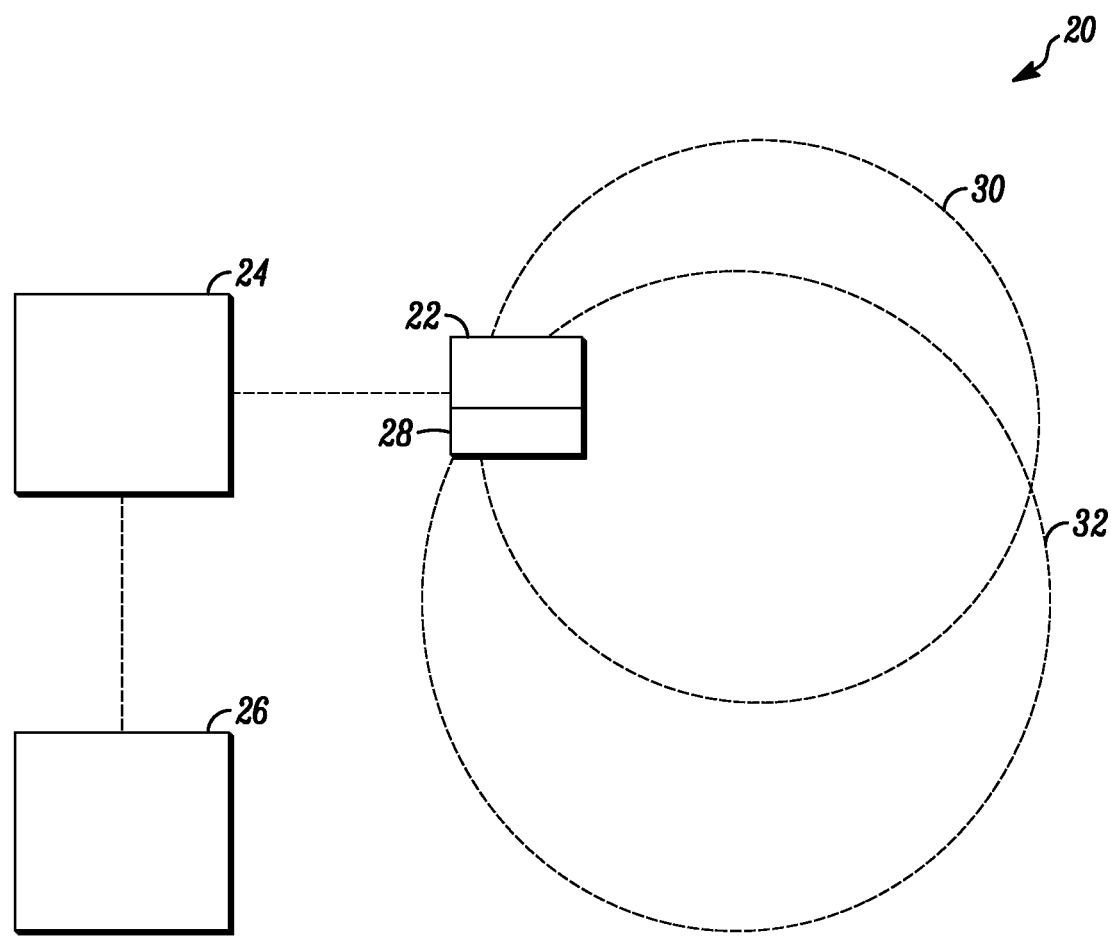
FIG. 1 is a block diagram of a drone device management system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein may include systems and methods for dynamically masking video or images captured by a drone device camera. For example, systems and methods disclosed herein may dynamically mask a portion of second video or images captured by the drone device camera that contains a first privacy masking area identified in first video or images captured by the drone device camera or a second privacy masking area identified in the second video or images capture by the drone device camera.

Systems and methods as disclosed herein are described in connection with a drone device management system. It is to be understood that such a drone device management system may include, but is not limited to a drone device, the drone device camera carried by the drone device, and a control system in communication with the drone device or the drone device camera. It is to be further understood that such a drone device management system may be a standalone system or integrated into standard or custom security systems.

In accordance with disclosed embodiments, the drone device may fly proximate to a potential surveillance area while in a learning mode, the drone device camera may capture the first video or images of the potential surveillance area, and systems and methods disclosed herein may identify first privacy masking areas in the first video or images. Furthermore, the drone device may fly proximate to an active surveillance area while in a standard mode, the drone device camera may capture second video or images of the active surveillance area, and systems and methods disclosed herein may identify second privacy masking areas in the second video or images. In some embodiments, the active surveillance area may be the same as the potential surveillance area.

In some embodiments, the drone device or the drone device camera may identify the first and second privacy masking areas. Additionally or alternatively, in some embodiments, the control system in communication with the drone device or the drone device camera may identify the first and second privacy masking areas.

In some embodiments, the first and second privacy masking areas may correspond to geographic coordinates that should not be viewed or captured by the drone device camera. For example, in some embodiments, identifying the first and second privacy masking areas may include identifying privacy landmarks in the first video or images and the second video or images or identifying the geographic coordinates associated with the privacy landmarks. For example, the privacy landmarks may include swimming pools, fence lines, or similar physical structures. In some embodiments, the first and second video or images may include at least one of live streaming images from the drone device camera, static images captured by the drone device camera, and recorded or time-shifted video captured by the drone device camera.

In accordance with disclosed embodiments, systems and methods may dynamically mask a portion of the second video or images that contains any of the first privacy masking areas or the second privacy masking areas. For example, the second video or images may be dynamically masked by visually obscuring the portion of the second video or images, reducing visual clarity of the second video or images, or overlaying additional images on the second video or images. In some embodiments, the drone device may dynamically mask the second video or images prior to transmitting the second video or images to the control system. Additionally or alternatively, in some embodiments, the control system may dynamically mask the second video or images prior to displaying the second video or images on a display device of the control system. Additionally or alternatively, in some embodiments, the drone device camera or the control system may simultaneously record the second video or images as dynamically masked In some embodiments, systems and methods disclosed herein may retrieve drone privacy data from a cloud database, and the drone privacy data may identify the first and second privacy masking areas or the geographic coordinates thereof. Furthermore, in some embodiments, systems and methods disclosed herein may receive user input identifying the first privacy masking areas in the first video or images and may receive user input identifying the second privacy masking areas in the second video or images. For example, the user input may identify a portion or all of the first video or images to be part of the first privacy masking areas.

In some embodiments, systems and methods disclosed herein may use the drone privacy data to suggest the first or second privacy masking areas to a user, and the user input may confirm the first and second privacy masking areas or the geographic coordinates thereof to be included in the drone privacy data. For example, in some embodiments, the drone privacy data may include pre-configured areas designated as private that, when recognized in the first or second video or images, may be included with the first or second privacy masking areas suggested to the user. Additionally or alternatively, the drone privacy data may include generic or specific privacy landmarks or criteria that may be used to identify the first or second privacy masking areas suggested to the user.

In some embodiments, the cloud database may be accessible by a plurality of users or a plurality of drone devices, thereby facilitating the identification of private areas without reliance on a particular user's knowledge. Nevertheless, systems and methods disclosed herein can maintain the effectiveness of the drone device as a security monitoring tool because each of the plurality of users may confirm or reject the first and second privacy masking areas.

FIG. 1 is a block diagram of a drone device management system 20 in accordance with disclosed embodiments. As seen in FIG. 1, the drone device management system 20 may include a drone device 22, a control system 24 wirelessly coupled to the drone device 22, and a cloud server 26 coupled to the control system 24. The drone device 22 may include a camera 28 for capturing video or images during a flight of the drone device 22, and the drone device 22 may fly in various preconfigured or custom flight paths responsive to signals from the control system 24 or user input received by the control system 24. For example, the drone device 22 may fly proximate to a potential surveillance area 30 and an active surveillance area 32.

Figure 2:
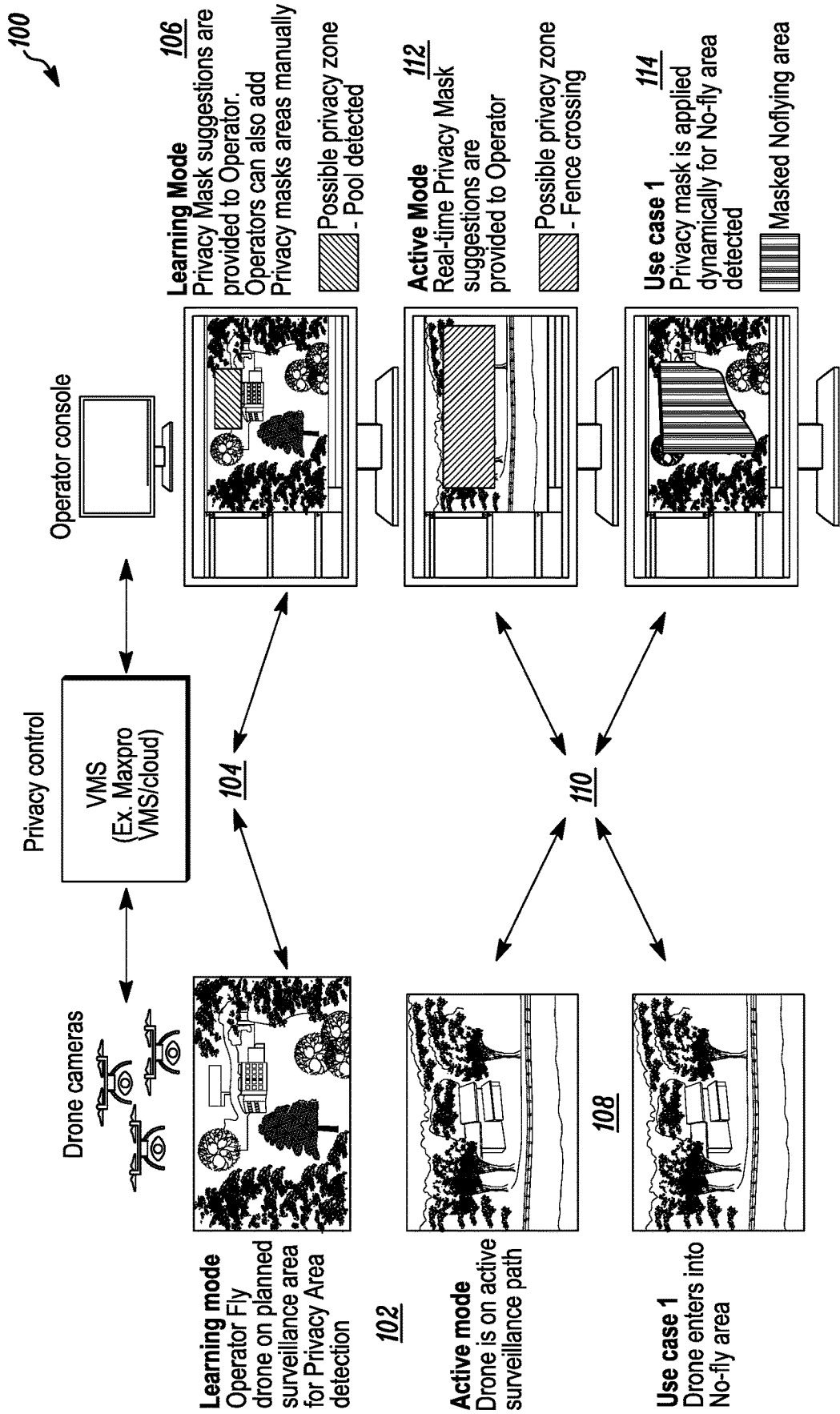
FIG. 2 is flow diagram of a method in accordance with disclosed embodiments.

FIG. 2 is a flow diagram of a method 100 in accordance with disclosed embodiments. The drone device 22 may fly proximate to the potential surveillance area 30 while in a learning mode, and the camera 28 may capture first video or images of the potential surveillance area 30, as in 102. Then, the drone device 22 may transmit the first video or images to the control system 24, as in 104, and the control system 24 may identify first privacy masking areas in the first video or images, as in 106. For example, in some embodiments, the control system 24 may retrieve drone privacy data from the cloud server 26 for use in identifying the first privacy masking areas. The drone device 22 may also fly proximate to the active surveillance area 32 in a standard mode, and the camera 30 may capture second video or images of the active surveillance area 32, as in 108. Then, the drone device 22 may transmit the second video or images to the control system 24, as in 110, and the control system 24 may identify second privacy masking areas in the second video or images, as in 112. For example in some embodiments, the control system 24 may retrieve the drone privacy data, including the first privacy masking areas, from the cloud server 26 for use in identifying the second privacy masking areas. When a portion of the second video or images includes any of the first privacy masking areas or the second privacy masking areas, the control system 24 may dynamically mask any such portion of the second video or images, as in 114.

Although a few embodiments have been described in detail above, other modifications are possible. For example, the steps described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
   instructing a drone device to fly proximate to a potential surveillance area while in a learning mode;
   while in the learning mode, instructing a camera carried by the drone device to capture learning mode video or images of the potential surveillance area;
   receiving the learning mode video or images of the potential surveillance area from the camera or the drone device and identifying learning mode privacy masking areas in the learning mode video or images, wherein each learning mode privacy masking area corresponds to a region having a fixed geographical location in the potential surveillance area;
   instructing the drone device to fly proximate to an active surveillance area while in a standard mode, wherein the active surveillance area includes at least part of the potential surveillance area;
   while in the standard mode, instructing the camera carried by the drone device to capture standard mode video or images of the active surveillance area, including standard mode video or images of at least part of the potential surveillance area;
   receiving the standard mode video or images of the active surveillance area from the camera or the drone device and identifying each of one or more learning mode privacy masking areas in the standard mode video or images based at least in part on the fixed geographical location of the region that corresponds to the learning mode privacy masking area; and
   dynamically masking a portion of the standard mode video or images that correspond to each of the one or more learning mode privacy masking areas identified in the standard mode video or images.

2. The method of claim 1 wherein each learning mode privacy masking area corresponds to a privacy landmark at a fixed geographical location in the potential surveillance area, and wherein identifying the standard mode privacy masking areas in the standard mode video or images includes identifying the corresponding privacy landmarks in the standard mode video or images.

3. The method of claim 1 further comprising:
   retrieving drone privacy data from a cloud database;
   using the drone privacy data to suggest at least one of the learning mode privacy masking areas in the learning mode video or images to a user;
   receiving first user input selecting the at least one of the learning mode privacy masking areas; and
   updating the drone privacy data to include the at least one of the learning mode privacy masking areas.

4. The method of claim 1 wherein identifying the learning mode privacy masking areas in the learning mode video or images includes receiving user input designating at least one of the learning mode privacy masking areas.

5. The method of claim 3 further comprising:
   using the drone privacy data to suggest at least one of the standard mode privacy masking areas in the standard mode video or images to the user;
   receiving second user input selecting the at least one of the standard mode privacy masking areas; and
   updating the drone privacy data to include the at least one of the standard mode privacy masking areas.

6. The method of claim 1 wherein the learning mode video or images and the standard mode video or images include at least one of live streaming images captured by the camera, static images captured by the camera, and recorded or time-shifted video captured by the camera.

7. The method of claim 1 wherein the drone device or the camera dynamically masks the portion of the standard mode video or images that contains any of the learning mode privacy masking areas prior to transmitting the standard mode video or images.

8. The method of claim 1 wherein a control system in communication with the drone device or the camera dynamically masks the portion of the standard mode video or images that contains any of the learning mode privacy masking areas prior to displaying the standard mode video or images on a user interface device of the control system.

9. The method of claim 1 wherein the active surveillance area is the potential surveillance area.

10. The method of claim 1 further comprising recording the standard mode video or images while also dynamically masking the portion of the standard mode video or images that contains any of the learning mode privacy masking areas.

11. A system comprising:
a drone device;
a camera carried the drone device;
and a control system in communication with the drone device or the camera,
wherein the drone device receives instructions to fly proximate to a potential surveillance area while in a learning mode and subsequently receives instructions to fly proximate to an active surveillance area in a standard mode,
wherein the camera carried by the drone receives instructions to capture learning mode video or images of the potential surveillance area and receives instructions to capture standard mode video or images of the active surveillance area, and
wherein the control system is configured to:
receive the learning mode video or images of the potential surveillance area from the camera or the drone device;
identify learning mode privacy masking areas from the learning mode video or images, wherein each learning mode privacy masking area corresponds to a region having a fixed geographical location in the potential surveillance area;
receive the standard mode video or images of the active surveillance area from the camera or the drone device;
identify each of one or more learning mode privacy masking areas in the standard mode video or images based at least in part on the fixed geographical location of the region that corresponds to the learning mode privacy masking area;
dynamically mask a portion of the standard mode video or images that contains any of the identified learning mode privacy masking areas.

12. The system of claim 11 wherein each learning mode privacy masking area corresponds to a privacy landmark at a fixed geographical location in the potential surveillance area, and wherein identifying the standard mode privacy masking areas in the standard mode video or images includes identifying the corresponding privacy landmarks in the standard mode video or images.

13. The system of claim 11 wherein the control system is configured to retrieve drone privacy data from a cloud database, use the drone privacy data to suggest at least one of the learning mode masking areas in the learning mode video or images, receive first user input selecting the at least one of the learning mode privacy masking areas, and update the drone privacy data to include the at least one of the learning mode privacy masking areas.

14. The system of claim 11 wherein identifying the learning mode privacy masking areas from the learning mode video or images includes receiving user input designating at least one of the learning mode privacy masking areas.

15. The system of claim 13 wherein the control system is configured to use the drone privacy data to suggest at least one of the standard mode privacy masking areas from the standard mode video or images, receive second user input selecting the at least one of the standard mode privacy masking areas, and update the drone privacy data to include the at least one of the standard mode privacy masking areas.

16. The system of claim 11 wherein the learning mode video or images and the standard mode video or images include at least one of live streaming images captured by the camera, static images captured by the camera, and recorded or time-shifted video captured by the camera.

17. The system of claim 11 wherein the control system in communication with the drone device or the camera dynamically masks the portion of the standard mode video or images that contains any of the learning mode privacy masking areas prior to displaying the standard mode video or images on a user interface device of the control system.

18. The system of claim 11 wherein the active surveillance area is the potential surveillance area.

19. The system of claim 11 wherein the control system records the standard mode video or images while also dynamically masking the portion of the standard mode video or images that contains any of the learning mode privacy masking areas.

20. A system comprising:
a drone device;
a camera carried the drone device;
a control system in communication with the drone device or the camera,
wherein the drone device receives instructions to fly proximate to a potential surveillance area while in a learning mode and subsequently receives instructions to fly proximate to an active surveillance area in a standard mode;
wherein the camera carried by the drone receives instructions to capture learning mode video or images of the potential surveillance area and receives instructions to capture standard mode video or images of the active surveillance area;
wherein the control system, receives the learning mode video or images of the potential surveillance area from the camera or the drone device, identifies learning mode privacy masking areas from the learning mode video or images wherein each learning mode privacy masking area corresponds to a region having a fixed geographical location in the potential surveillance area, receives the standard mode video or images of the active surveillance area from the camera or the drone device, and identifies each of one or more learning mode privacy masking areas in the standard mode video or images based at least in part on the fixed geographical location of the region that corresponds to the learning mode privacy masking area, and
wherein the drone device and/or the camera dynamically masks a portion of the standard mode video or images that contain any of the learning mode privacy masking areas prior to transmitting the standard mode video or images.

* * * * *